US012620358B2

(12) United States Patent
Lee et al.

(10) Patent No.: US 12,620,358 B2
(45) Date of Patent: May 5, 2026

(54) PIXEL OF A DISPLAY DEVICE AND DISPLAY DEVICE

(71) Applicants: Samsung Display Co., Ltd., Yongin-Si (KR); University-Industry Cooperation Group of Kyung Hee University, Yongin-Si (KR)

(72) Inventors: Jiyoung Lee, Yongin-si (KR); Hyoungsik Nam, Seoul (KR); Hyunyoung Choi, Yongin-si (KR); Hyung Uk Cho, Yongin-si (KR); Hyeonseong Cho, Seoul (KR); Yeonhak Pyo, Seoul (KR)

(73) Assignees: Samsung Display Co., Ltd., Yongin-si (KR); University-Industry Cooperation Group of Kyung Hee University, Yongin-si (KR)

( * ) Notice: Subject to any disclaimer, the term of this patent is extended or adjusted under 35 U.S.C. 154(b) by 0 days.

(21) Appl. No.: 19/098,988

(22) Filed: Apr. 3, 2025

(65) Prior Publication Data

US 2026/0031037 A1 Jan. 29, 2026

(30) Foreign Application Priority Data

Jul. 26, 2024 (KR) ........................ 10-2024-0099676

(51) Int. Cl.
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2300/0861* (2013.01); *G09G 2310/08* (2013.01); *G09G 2320/0233* (2013.01)

(58) Field of Classification Search
CPC ......... G09G 3/3233; G09G 2300/0819; G09G 2300/0842; G09G 2300/0861; G09G 2310/08; G09G 2320/0233
See application file for complete search history.

(56) References Cited

U.S. PATENT DOCUMENTS

2021/0110771 A1* 4/2021 Lee ...................... G09G 3/3258
2022/0293695 A1* 9/2022 Jo ............................ G09G 3/32

* cited by examiner

*Primary Examiner* — Matthew A Eason
*Assistant Examiner* — Chayce R Bibbee
(74) *Attorney, Agent, or Firm* — Innovation Counsel LLP

(57) ABSTRACT

A pixel of a display device includes a first transistor including a gate connected to a gate node, a first terminal connected to a drain node, and a second terminal connected to a source node, a second transistor configured to transfer a first power supply voltage to the gate node in response to an initialization signal, a third transistor configured to diode-connect the first transistor in response to a write signal, a fourth transistor configured to transfer a second power supply voltage to the source node in response to the write signal, a fifth transistor configured to transfer the first power supply voltage to the drain node in response to an emission signal, a capacitor including a first electrode connected to a data line, and a second electrode connected to the gate node, and a light emitting element including an anode connected to the source node, and a cathode which receives the second power supply voltage.

20 Claims, 13 Drawing Sheets

INIP

PIXEL OF A DISPLAY DEVICE AND DISPLAY DEVICE

CROSS-REFERENCE TO RELATED APPLICATION(S)

This application claims priority, under 35 USC § 119, to Korean Patent Application No. 10-2024-0099676 filed on Jul. 26, 2024 in the Korean Intellectual Property Office (KIPO), the content of which is incorporated by reference herein in its entirety.

BACKGROUND

1. Field

Embodiments of the present disclosure relate to a display device, and more particularly to a pixel and a display device including the pixel.

2. Description of the Related Art

Driving transistors of pixels of a display device, such as an organic light emitting diode (OLED) display device, may have different threshold voltages due to process variation, degradation, etc. Due to this threshold voltage variation, the pixels of the display device may not emit light with uniform luminance. To prevent or reduce the luminance non-uniformity, a pixel performing a threshold voltage compensation operation that stores a threshold voltage of a driving transistor in a storage capacitor has been developed.

A pixel including N-type metal oxide semiconductor ("NMOS") transistors may perform a threshold voltage compensation operation in a source follower method by turning on a driving transistor until a threshold voltage of the driving transistor is stored in a storage capacitor. However, in the pixel performing the threshold voltage compensation operation in the source follower method, a long time may be required for an accurate threshold voltage to be stored in the storage capacitor.

SUMMARY

Some embodiments provide a pixel that includes N-type metal oxide semiconductor ("NMOS") transistors and that performs a threshold voltage compensation operation in a diode connection method.

Some embodiments provide a display device including a pixel that includes NMOS transistors and that performs a threshold voltage compensation operation in a diode connection method.

According to some embodiments, there is provided a pixel of a display device including a first transistor including a gate connected to a gate node, a first terminal connected to a drain node, and a second terminal connected to a source node, a second transistor configured to transfer a first power supply voltage to the gate node in response to an initialization signal, a third transistor configured to diode-connect the first transistor in response to a write signal, a fourth transistor configured to transfer a second power supply voltage to the source node in response to the write signal, a fifth transistor configured to transfer the first power supply voltage to the drain node in response to an emission signal, a capacitor including a first electrode connected to a data line, and a second electrode connected to the gate node, and a light emitting element including an anode connected to the source node, and a cathode which receives the second power supply voltage.

In some embodiments, when the write signal has a high level, the fourth transistor may transfer the second power supply voltage to the source node, the third transistor may connect the gate node and the drain node to each other, and the gate node may have a voltage corresponding to a sum of the second power supply voltage and a threshold voltage of the first transistor.

In embodiments, when the write signal has the high level, a data voltage may be applied to the first electrode of the capacitor through the data line.

In some embodiments, when the emission signal has the high level, an emission voltage higher than the data voltage may be applied to the first electrode of the capacitor through the data line.

In some embodiments, the second transistor may include a gate which receives the initialization signal, a first terminal which receives the first power supply voltage, and a second terminal connected to the gate node, the third transistor may include a gate which receives the write signal, a first terminal connected to the gate node, and a second terminal connected to the drain node, the fourth transistor may include a gate which receives the write signal, a first terminal connected to the source node, and a second terminal which receives the second power supply voltage, and the fifth transistor may include a gate which receives the emission signal, a first terminal which receives the first power supply voltage, and a second terminal connected to the drain node.

In some embodiments, the first through fifth transistors may be N-type metal oxide semiconductor (NMOS) transistors.

In some embodiments, the initialization signal may be substantially simultaneously applied to a plurality of pixels of the display device, the write signal may be sequentially applied to the plurality of pixels on a row-by-row basis, and the emission signal may be substantially simultaneously applied to the plurality of pixels.

In some embodiments, a frame period for the display device may include an initialization period in which the gate node is initialized, a data writing and compensation period in which a data voltage is provided through the data line and a threshold voltage compensation operation is performed in a diode connection method, and an emission period in which the light emitting element emits light.

In some embodiments, in the initialization period, the initialization signal may have a high level, the write signal and the emission signal may have a low level, an emission voltage may be provided through the data line, the second transistor may transfer the first power supply voltage to the gate node in response to the initialization signal having the high level, and the gate node may be initialized based on the first power supply voltage.

In some embodiments, during the data writing and compensation period, the write signal may have a high level, the initialization signal and the emission signal may have a low level, the data voltage may be provided through the data line, the fourth transistor may transfer the second power supply voltage to the source node in response to the write signal having the high level, the third transistor may diode-connect the first transistor in response to the write signal having the high level, a voltage of the gate node may be changed from the first power supply voltage to a voltage corresponding to a sum of the second power supply voltage and a threshold voltage of the first transistor, and the data voltage may be applied to the first electrode of the capacitor through the data line.

In some embodiments, during the emission period, the emission signal may have a high level, the initialization signal and the write signal may have a low level, an emission voltage may be provided through the data line, the fifth transistor may be turned on in response to the emission signal having the high level, the emission voltage higher than the data voltage may be applied to the first electrode of the capacitor through the data line, the first transistor may generate a driving current based on a voltage of the gate node, and the light emitting element may emit light based on the driving current.

In some embodiments, the pixel may further include a sixth transistor disposed between the data line and the first electrode of the capacitor, and configured to connect the data line to the first electrode of the capacitor in response to the write signal, a seventh transistor configured to transfer the first power supply voltage to the first electrode of the capacitor in response to the initialization signal, and an eighth transistor configured to transfer the first power supply voltage to the first electrode of the capacitor in response to the emission signal.

In some embodiments, the sixth transistor may include a gate which receives the write signal, a first terminal connected to the first electrode of the capacitor, and a second terminal connected to the data line, the seventh transistor may include a gate which receives the initialization signal, a first terminal which receives the first power supply voltage, and a second terminal connected to the first electrode of the capacitor, and the eighth transistor may include a gate which receives the emission signal, a first terminal which receives the first power supply voltage, and a second terminal connected to the first electrode of the capacitor.

In some embodiments, the first through eighth transistors may be NMOS transistors.

In embodiments, the initialization signal, the write signal and the emission signal may be sequentially applied to a plurality of pixels of the display device on a row-by-row basis.

According to some embodiments, there is provided a pixel of a display device including a first transistor including a gate connected to a gate node, a first terminal connected to a drain node, and a second terminal connected to a source node, a second transistor including a gate which receives an initialization signal, a first terminal which receives a first power supply voltage, and a second terminal connected to the gate node, a third transistor including a gate which receives a write signal, a first terminal connected to the gate node, and a second terminal connected to the drain node, a fourth transistor including a gate which receives the write signal, a first terminal connected to the source node, and a second terminal which receives a second power supply voltage, a fifth transistor including a gate which receives an emission signal, a first terminal which receives the first power supply voltage, and a second terminal connected to the drain node, a capacitor including a first electrode connected to a data line, and a second electrode connected to the gate node, and a light emitting element including an anode connected to the source node, and a cathode which receives the second power supply voltage.

In some embodiments, the initialization signal may be substantially simultaneously applied to a plurality of pixels of the display device, the write signal may be sequentially applied to the plurality of pixels on a row-by-row basis, and the emission signal may be substantially simultaneously applied to the plurality of pixels.

In some embodiments, the pixel may further include a sixth transistor disposed between the data line and the first electrode of the capacitor, and including a gate which receives the write signal, a first terminal connected to the first electrode of the capacitor, and a second terminal connected to the data line, a seventh transistor including a gate which receives the initialization signal, a first terminal which receives the first power supply voltage, and a second terminal connected to the first electrode of the capacitor, and an eighth transistor including a gate which receives the emission signal, a first terminal which receives the first power supply voltage, and a second terminal connected to the first electrode of the capacitor.

In some embodiments, the initialization signal, the write signal and the emission signal may be sequentially applied to a plurality of pixels of the display device on a row-by-row basis.

According to some embodiments, there is provided a display device including a display panel including a plurality of pixels, a data driver configured to provide a data voltage to each of the plurality of pixels, a scan driver configured to provide an initialization signal and a write signal to each of the plurality of pixels, an emission driver configured to provide an emission signal to each of the plurality of pixels, and a controller configured to control the data driver, the scan driver and the emission driver. Each of the plurality of pixels includes a first transistor including a gate connected to a gate node, a first terminal connected to a drain node, and a second terminal connected to a source node, a second transistor configured to transfer a first power supply voltage to the gate node in response to the initialization signal, a third transistor configured to diode-connect the first transistor in response to the write signal, a fourth transistor configured to transfer a second power supply voltage to the source node in response to the write signal, a fifth transistor configured to transfer the first power supply voltage to the drain node in response to the emission signal, a capacitor including a first electrode connected to a data line, and a second electrode connected to the gate node, and a light emitting element including an anode connected to the source node, and a cathode which receives the second power supply voltage.

According to some embodiments, there is provided an electronic device including a processor configured to provide input image data, and a display device configured to receive the input image data from the processor, and to display an image based on the input image data. The display device includes a display panel including a plurality of pixels, a data driver configured to provide a data voltage to each of the plurality of pixels, a scan driver configured to provide an initialization signal and a write signal to each of the plurality of pixels, an emission driver configured to provide an emission signal to each of the plurality of pixels, and a controller configured to control the data driver, the scan driver and the emission driver. Each of the plurality of pixels includes a first transistor including a gate connected to a gate node, a first terminal connected to a drain node, and a second terminal connected to a source node, a second transistor configured to transfer a first power supply voltage to the gate node in response to the initialization signal, a third transistor configured to diode-connect the first transistor in response to the write signal, a fourth transistor configured to transfer a second power supply voltage to the source node in response to the write signal, a fifth transistor configured to transfer the first power supply voltage to the drain node in response to the emission signal, a capacitor including a first electrode connected to a data line, and a second electrode connected to the gate node, and a light emitting element including an anode connected to the source node, and a cathode which receives the second power supply voltage.

As described above, a pixel of a display device according to some embodiments may include NMOS transistors, and may perform a threshold voltage compensation operation in a diode connection method.

Further, the pixel of the display device according to some embodiments may include a small number of transistors, and may have a small size.

In addition, the pixel of the display device according to some embodiments may receive a small number of scan signals, and the display device according to some embodiments may include a small number of drivers.

BRIEF DESCRIPTION OF THE DRAWINGS

Illustrative, non-limiting embodiments will be more clearly understood from the following detailed description in conjunction with the accompanying drawings.

DETAILED DESCRIPTION OF THE EMBODIMENTS

Figure 1:
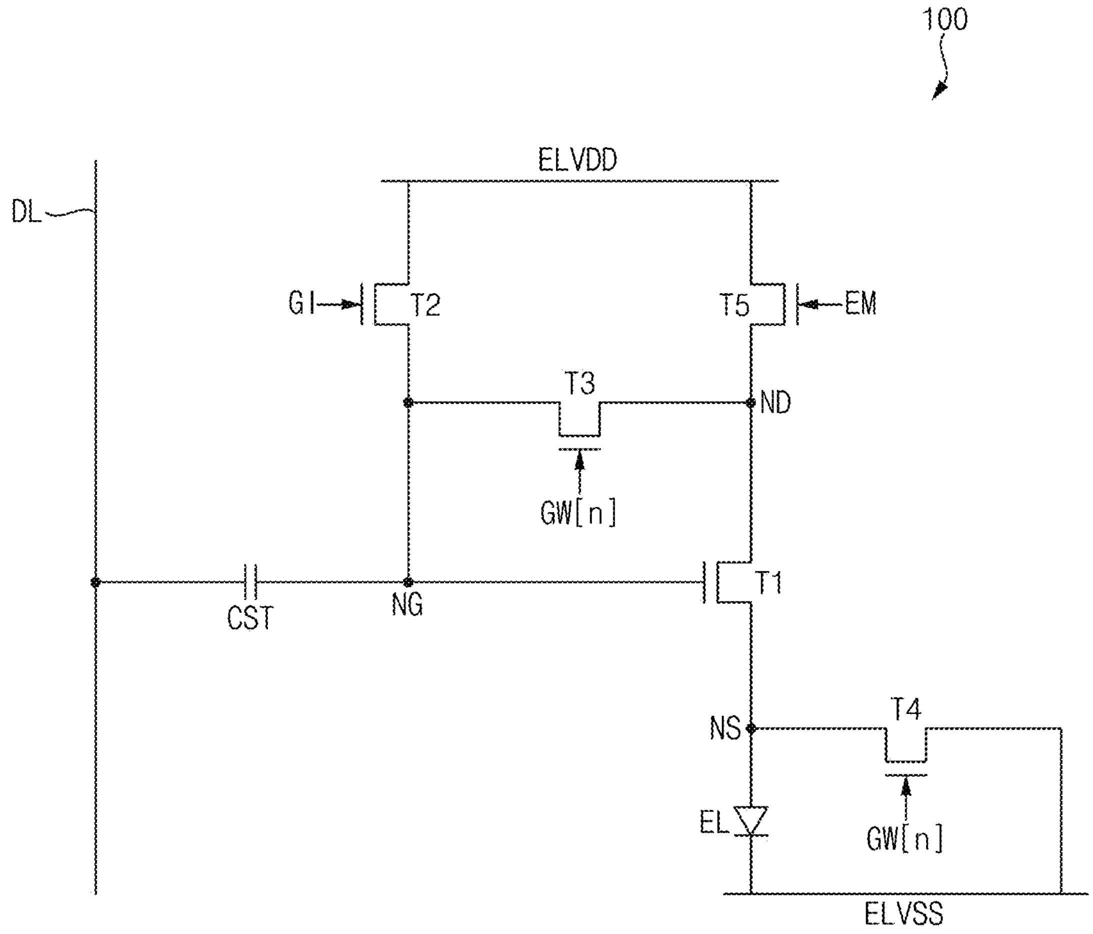
FIG. 1 is a circuit diagram illustrating a pixel according to some embodiments.

Hereinafter, embodiments of the present inventive concept will be explained in detail with reference to the accompanying drawings. Like or similar reference numerals refer to like or similar elements throughout.

FIG. 1 is a circuit diagram illustrating a pixel according to some embodiments.

Referring to FIG. 1, a pixel 100 according to an embodiment may include a first transistor T1, a second transistor T2, a third transistor T3, a fourth transistor T4, a fifth transistor T5, a capacitor CST and a light emitting element EL.

The first transistor T1 may generate a driving current based on a voltage of a gate node NG. For example, the first transistor T1 may be referred to as a driving transistor for driving the light emitting element EL. In some embodiments, the first transistor T1 may include a gate connected to the gate node NG, a first terminal (e.g., a drain) connected to a drain node ND, and a second terminal (e.g., a source) connected to a source node NS.

Figure 2:
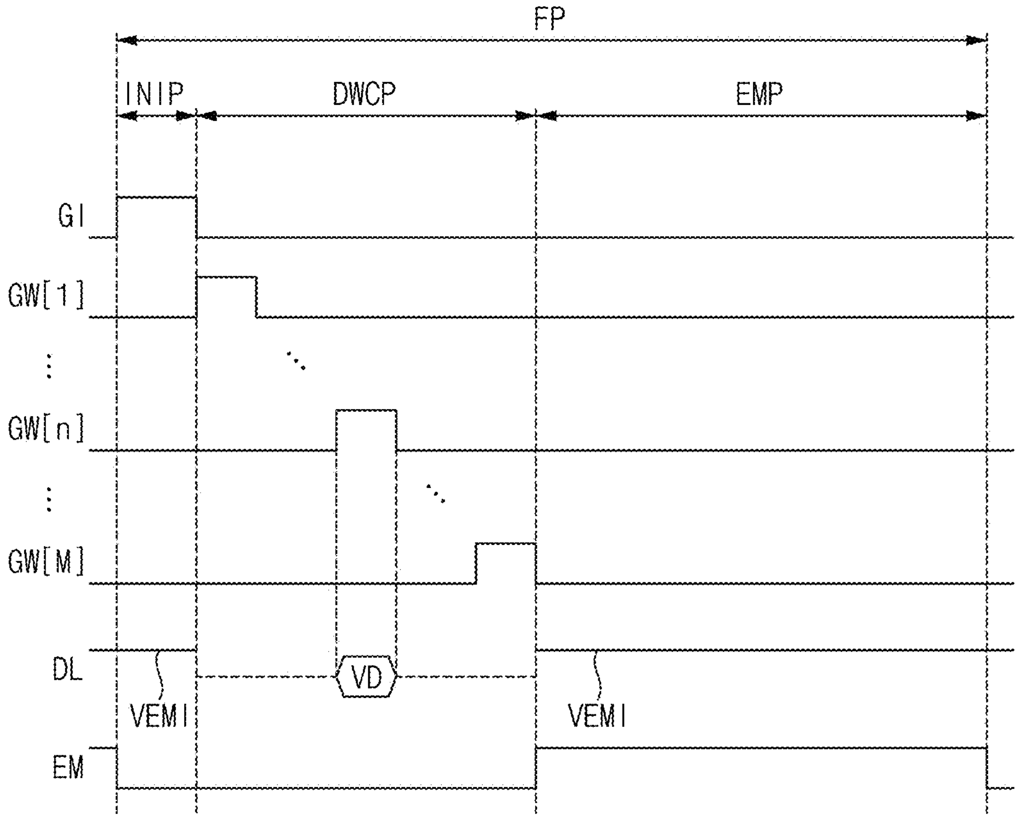
FIG. 2 is a timing diagram for describing an example of an operation of a pixel according to some embodiments.

The second transistor T2 may transfer a first power supply voltage ELVDD (e.g., a high power supply voltage) to the gate node NG in response to an initialization signal GI. For example, the second transistor T2 may be referred to as an initialization transistor for initializing the gate node NG. In some embodiments, as illustrated in FIG. 2, the initialization signal GI may be a global signal that is substantially simultaneously applied to a plurality of pixels of a display device. In other embodiments, the initialization signal GI may be sequentially applied to the plurality of pixels of the display device on a row-by-row basis. Further, in some embodiments, the second transistor T2 may include a gate which receives the initialization signal GI, a first terminal which receives the first power supply voltage ELVDD, and a second terminal connected to the gate node NG.

The third transistor T3 may diode-connect the first transistor T1 in response to a write signal GW[n]. For example, the third transistor T3 may be referred to as a compensation transistor for performing a threshold voltage compensation operation in a diode compensation manner by diode-connecting the first transistor T1. In some embodiments, as illustrated in FIG. 2, the write signal GW[n] may be sequentially applied to the plurality of pixels of the display device on a row-by-row basis. Further, in some embodiments, the third transistor T3 may include a gate which receives the write signal GW[n], a first terminal connected to the gate node NG, and a second terminal connected to the drain node ND.

The fourth transistor T4 may transfer a second power supply voltage ELVSS (e.g., a low power supply voltage) to the source node NS in response to the write signal GW[n]. In some embodiments, the fourth transistor T4 may include a gate which receives the write signal GW[n], a first terminal connected to the source node NS, and a second terminal which receives the second power supply voltage ELVSS.

The fifth transistor T5 may transfer the first power supply voltage ELVDD to the drain node ND in response to an emission signal EM. For example, the fifth transistor T5 may be referred to as an emission transistor for forming a path for the driving current provided to the light emitting element EL. In some embodiments, as illustrated in FIG. 2, the emission signal EM may be a global signal that is substantially simultaneously applied to the plurality of pixels of the display device. Further, in some embodiments, the fifth transistor T5 may include a gate which receives the emission signal EM, a first terminal which receives the first power supply voltage ELVDD, and a second terminal connected to the drain node ND.

The capacitor CST may be connected between a data line DL and the gate node NG. For example, the capacitor CST may be referred to as a storage capacitor for storing a data voltage. In some embodiments, the capacitor CST may include a first electrode connected to the data line DL, and a second electrode connected to the gate node NG.

The light emitting element EL may emit light based on the driving current generated by the first transistor T1. In some embodiments, the light emitting element EL may be, but is not limited to, an organic light emitting diode (“OLED”). In other embodiments, the light emitting element EL may be a nano light emitting diode ("NED"), a quantum dot ("QD") light emitting diode, a micro light emitting diode, an inorganic light emitting diode, or any other suitable light emitting element. Further, in some embodiments, the light emitting element EL may include an anode connected to the source node NS, and a cathode which receives the second power supply voltage ELVSS.

In some embodiments, as illustrated in FIG. 1, the first through fifth transistors T1 through T5 of the pixel 100 may be N-type transistors, for example, N-type metal oxide semiconductor ("NMOS") transistors. In other embodiments, some or all of the first through fifth transistors T1 through T5 may be P-type transistors, for example, P-type metal oxide semiconductor ("PMOS") transistors.

In the pixel 100 according to an embodiment, when the write signal GW[n] has a high level, the third transistor T3 may connect the gate node NG and the drain node ND to each other. Thus, the gate and the drain of the first transistor T1 may be connected to each other, and the first transistor T1 may be diode-connected. Further, when the write signal GW[n] has the high level, the fourth transistor T4 may transfer the second power supply voltage ELVSS to the source node NS. Thus, since the second power supply voltage ELVSS is applied to the source of the first transistor T1, and the first transistor T1 is diode-connected, the voltage of the gate node NG may be changed (e.g., from the first power supply voltage ELVDD) to a voltage corresponding to a sum of the second power supply voltage ELVSS and a threshold voltage of the first transistor T1. Accordingly, the capacitor CST may store, at the second electrode connected to the gate node NG, a voltage to which the threshold voltage of the first transistor T1 is reflected, and the pixel 100 including the NMOS transistors may perform the threshold voltage compensation operation in a diode connection method by diode-connecting the first transistor T1.

Further, when the write signal GW[n] has the high level, the data voltage may be applied to the first electrode of the capacitor CST through the data line DL. Thus, since a voltage of the first electrode of the capacitor CST is the data voltage, and a voltage of the second electrode of the capacitor CST is the sum of the second power supply voltage ELVSS and the threshold voltage, the capacitor CST may store a voltage obtained by subtracting the sum of the second power supply voltage ELVSS and the threshold voltage from the data voltage between the first electrode and the second electrode. Thereafter, when the emission signal EM has the high level, an emission voltage higher than the data voltage may be applied to the first electrode of the capacitor CST through the data line DL. Thus, the voltage of the first electrode of the capacitor CST may be changed from the data voltage to the emission voltage by a voltage difference between the emission voltage and the data voltage, and the voltage of the second electrode of the capacitor CST, or the voltage of the gate node NG also may be changed by the voltage difference between the emission voltage and the data voltage. Accordingly, when the emission signal EM has the high level, the first transistor T1 may generate the driving current based on the voltage of the gate node NG to which the threshold voltage and the data voltage are reflected, and the light emitting element EL may emit light based on the driving current.

As described above, the pixel 100 according to embodiments may include the NMOS transistors, and may perform the threshold voltage compensation operation in the diode connection method. Further, the pixel 100 according to an embodiment may include five transistors T1 through T5, and may have a small size. In addition, the pixel 100 according to an embodiment may receive three signals GI, GW and EM, and the display device including the pixel 100 may include one or more drivers that generate only the three signals GI, GW and EM.

Hereinafter, an operation of the pixel 100 according to an embodiment is described below with reference to FIGS. 1 through 5.

Figure 3:
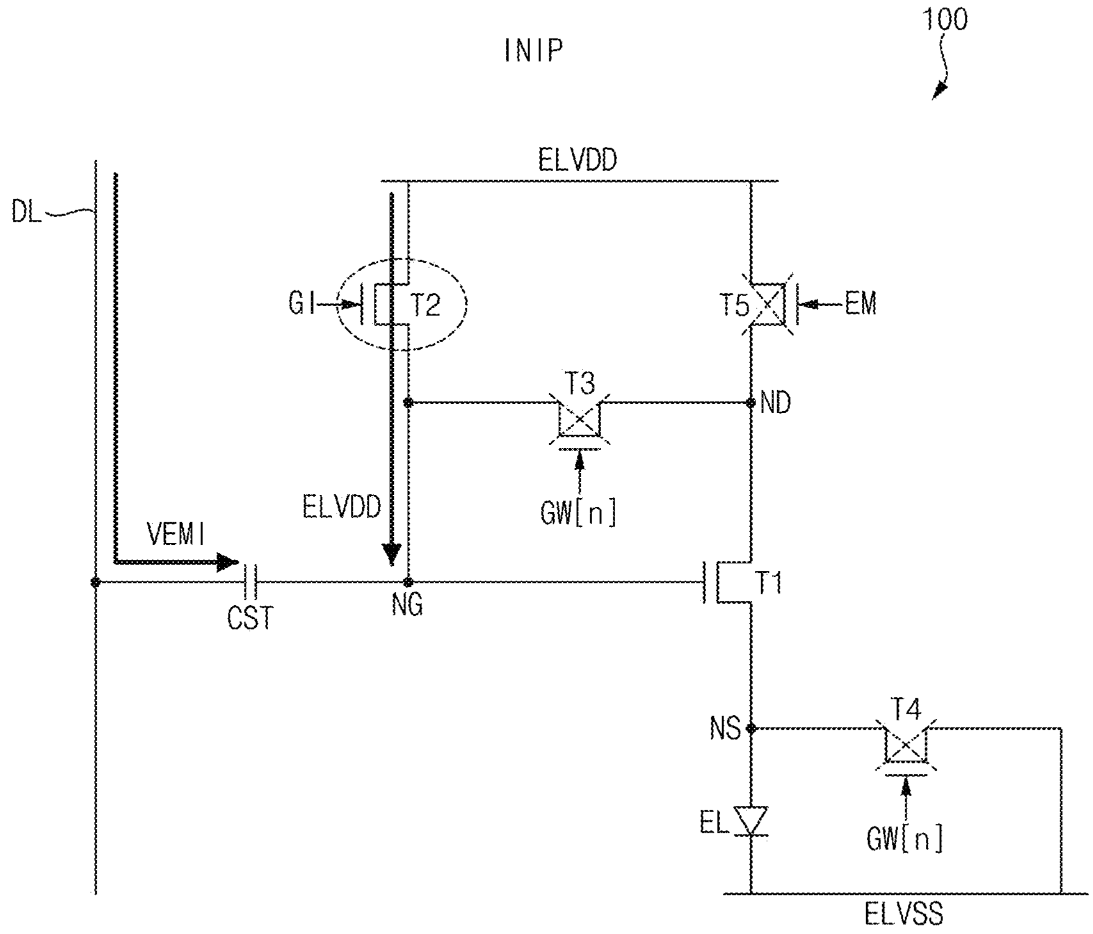
FIG. 3 is a circuit diagram for describing an operation of a pixel of FIG. 1 during an initialization period.
Figure 4:
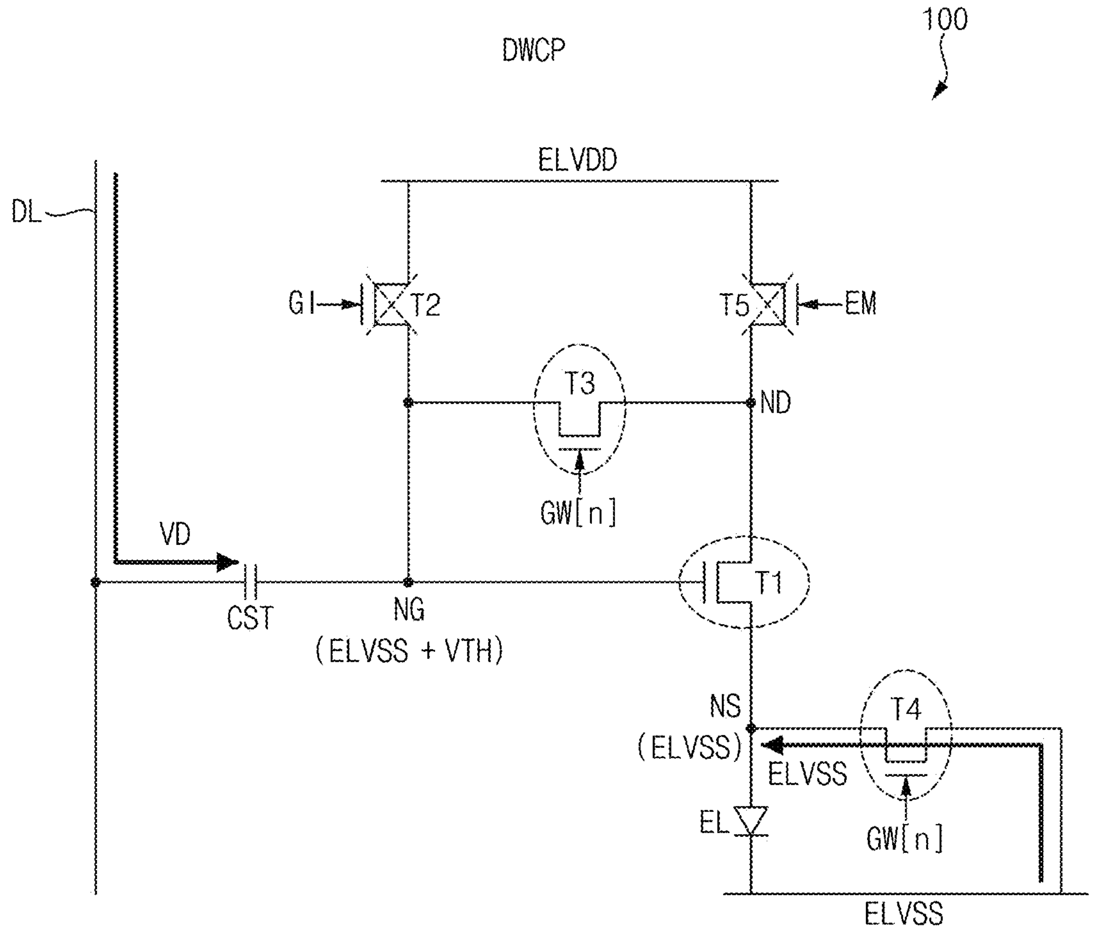
FIG. 4 is a circuit diagram for describing an operation of a pixel of FIG. 1 during a data writing and compensation period.
Figure 5:
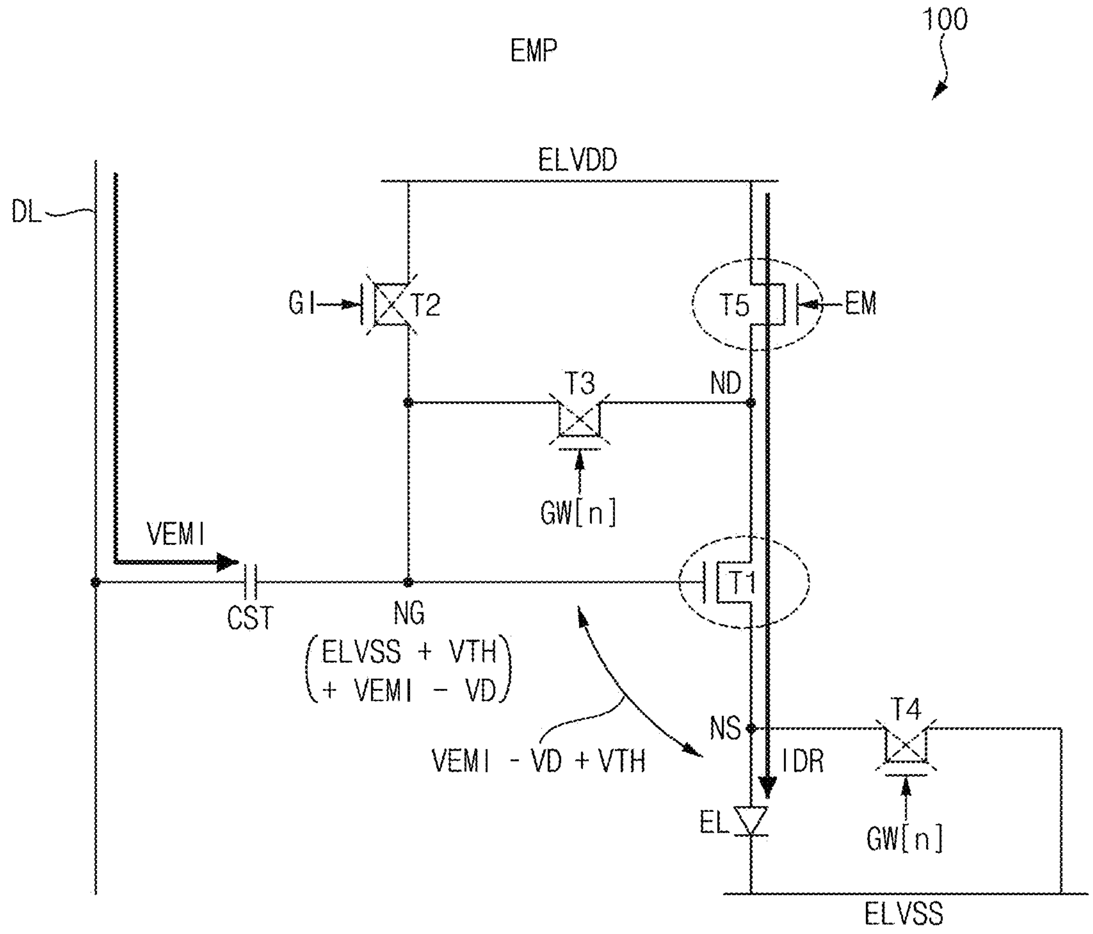
FIG. 5 is a circuit diagram for describing an operation of a pixel of FIG. 1 during an emission period.

FIG. 2 is a timing diagram for describing an example of an operation of a pixel according to embodiments, FIG. 3 is a circuit diagram for describing an operation of a pixel of FIG. 1 in an initialization period, FIG. 4 is a circuit diagram for describing an operation of a pixel of FIG. 1 during a data writing and compensation period, and FIG. 5 is a circuit diagram for describing an operation of a pixel of FIG. 1 during an emission period.

Referring to FIG. 1 and FIG. 2, a frame period FP for the display device including the pixel 100 may include an initialization period INIP in which the gate node NG is initialized, a data writing and compensation period DWCP in which the data voltage VD is provided through the data line DL and the threshold voltage compensation operation is performed in the diode connection method, and an emission period EMP in which the light emitting element EL emits light.

During the initialization period INIP, the initialization signal GI may have the high level, the write signal GW[n] and the emission signal EM have a low level, and the emission voltage VEMI may be provided to the pixel 100 through the data line DL. In some embodiments, the initialization signal GI having the high level may be substantially simultaneously applied to all the pixels of the display device. As illustrated in FIG. 3, the second transistor T2 may be turned on in response to the initialization signal GI having the high level, and may transfer the first power supply voltage ELVDD to the gate node NG. Thus, the gate node NG may be initialized based on the first power supply voltage ELVDD, and the voltage of the gate node NG may become the first power supply voltage ELVDD. Further, the emission voltage VEMI may be applied to the first electrode of the capacitor CST through the data line DL, and the voltage of the first electrode of the capacitor CST may become the emission voltage VEMI. In addition, the third, fourth and fifth transistors T3, T4 and T5 may be turned off.

During the data writing and compensation period DWCP, the write signal GW[n] may have the high level, the initialization signal GI and the emission signal EM may have the low level, and the data voltage VD may be provided to the pixel 100 through the data line DL. In some embodiments, the write signals GW[1], . . . , GW[n], . . . , and GW[M] having the high level may be sequentially applied to the plurality of pixels of the display device on a row-by-row basis. For example, in a case where a display panel of the display device includes first through M-th pixel rows, where M is an integer greater than 1, first through M-th write signals GW[1], . . . , GW[n], . . . , and GW[M] may be sequentially applied to the first through M-th pixel rows during the data writing and compensation period DWCP. As illustrated in FIG. 4, the third transistor T3 may be turned on in response to the write signal GW[n] having the high level, and may diode-connect the first transistor T1 by connecting the gate node NG and the drain node ND to each other. Further, the fourth transistor T4 may be turned on in response to the write signal GW[n] having the high level, and may transfer the second power supply voltage ELVSS to the source node NS. Thus, the voltage of the gate node NG may be changed from the first power supply voltage ELVDD to a voltage corresponding to the sum ELVSS+VTH of the second power supply voltage ELVSS and the threshold voltage VTH of the first transistor T1. Accordingly, the capacitor CST may store, at the second electrode connected to the gate node NG, a voltage to which the threshold voltage VTH of the first transistor T1 is reflected, or the voltage corresponding to the sum ELVSS+VTH of the second power supply voltage ELVSS and the threshold voltage VTH of the first transistor T1, and the pixel 100 may perform the threshold voltage compensation operation in the diode connection method. Further, the data voltage VD may be applied to the first electrode of the capacitor CST through the data line DL, and the voltage of the first electrode of the capacitor CST may become the data voltage VD.

During the emission period EMP, the emission signal EM may have the high level, the initialization signal GI and the write signal GW[n] may have the low level, and the emission voltage VEMI may be provided to the pixel 100 through the data line DL. In some embodiments, the emission signal EM having the high level may be substantially simultaneously applied to all the pixels of the display device. As illustrated in FIG. 5, the emission voltage VEMI may be applied to the first electrode of the capacitor CST through the data line DL. Thus, the voltage of the first electrode of the capacitor CST may be changed from the data voltage VD to the emission voltage VEMI by the voltage difference VEMI-VD between the emission voltage VEMI and the data voltage VD, and the voltage of the second electrode of the capacitor CST, or the voltage of the gate node NG also may be changed by the voltage difference VEMI-VD between the emission voltage VEMI and the data voltage VD. Accordingly, the voltage of the gate node NG may become "ELVSS+VTH+VEMI-VD". In addition, since the voltage of the source node NS is the second power supply voltage ELVSS, a gate-source voltage of the first transistor T1 may be "VEMI-VD+VTH", and the first transistor T1 may be turned on in a case where a voltage obtained by subtracting the data voltage VD from the emission voltage VEMI, or "VEMI-VD" is greater than about 0 V, that is, in a case where the emission voltage VEMI is higher than the data voltage VD.

Further, the emission voltage VEMI may be higher than the data voltage VD, the first transistor T1 may be turned on based on the voltage of the gate node NG, and the fifth transistor T5 may be turned on in response to the emission signal EM having the high level. In some embodiments, the emission voltage VEMI may be higher than the data voltages VD corresponding to all gray levels (e.g., from a 0-gray level to a 255-gray level). Thus, the first transistor T1 may generate the driving current IDR based on the voltage of the gate node NG, and the light emitting element EL may emit light based on the driving current IDR. Meanwhile, when the first transistor T1 is turned on, the voltage of the source node NS, or a voltage of the source of the first transistor T1 may be changed from the second power supply voltage ELVSS to "ELVDD−(ELVDD−ELVSS)*(RT5+RT1)/(RT5+RT1+REL)". Here, RT5 may be a turn-on resistance of the fifth transistor T5, RT1 may be a turn-on resistance of the first transistor T1, and REL may be a turn-on resistance of the light emitting element EL. Since the turn-on resistance of the fifth transistor T5 is less than the turn-on resistance of the first transistor T1, assuming "RT5" to be about zero, the gate-source voltage of the turned-on first transistor T1 may be "ELVSS+VTH+VEMI−VD−ELVDD+(ELVDD−ELVSS)*RT1/(RT1+REL)", or "ELVSS+VTH+VEMI−VD−ELVDD*REL/(RT1+REL)−ELVSS*RT1/(RT1+REL)". Accordingly, since the threshold voltage VTH of the first transistor T1 and the data voltage VD are reflected in the gate-source voltage of the turned-on first transistor T1, a current level of the driving current IDR generated by the first transistor T1 may be independent of the threshold voltage VTH of the first transistor T1, and may be determined according to a voltage level of the data voltage VD.

Figure 6:
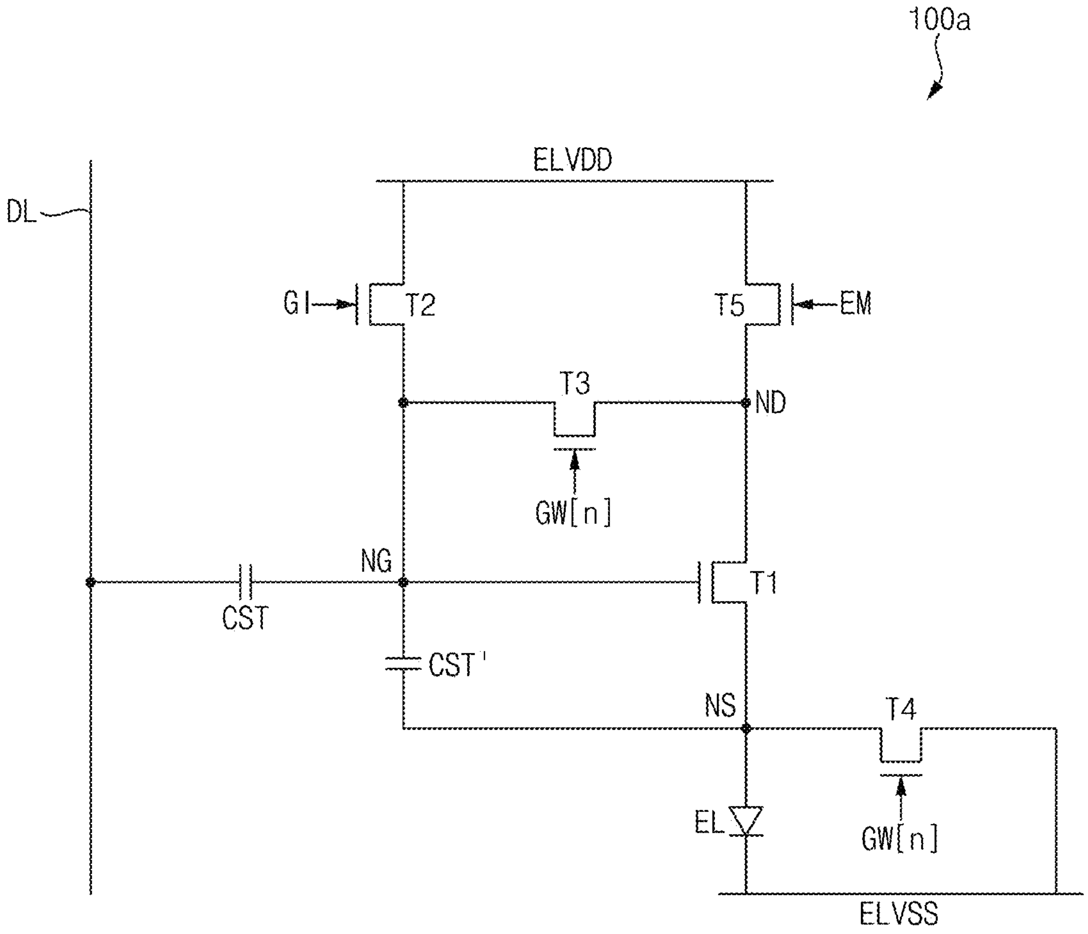
FIG. 6 is a circuit diagram illustrating a pixel according to some embodiments.

FIG. 6 is a circuit diagram illustrating a pixel according to an embodiment.

Referring to FIG. 6, a pixel 100*a* according to an embodiment may include a first transistor T1, a second transistor T2, a third transistor T3, a fourth transistor T4, a fifth transistor T5, a first capacitor CST, a second capacitor CST' and a light emitting element EL. The pixel 100*a* of FIG. 6 may have substantially the same configuration and substantially the same operation as a pixel 100 of FIG. 1, except that the pixel 100*a* may further include the second capacitor CST' connected between a gate node NG and a source node NS.

The second capacitor CST' may include a first electrode connected to the gate node NG, and a second electrode connected to the source node NS. With the second capacitor CST', a voltage of the gate node NG and a voltage of the source node NS may be more stably maintained.

Figure 7:
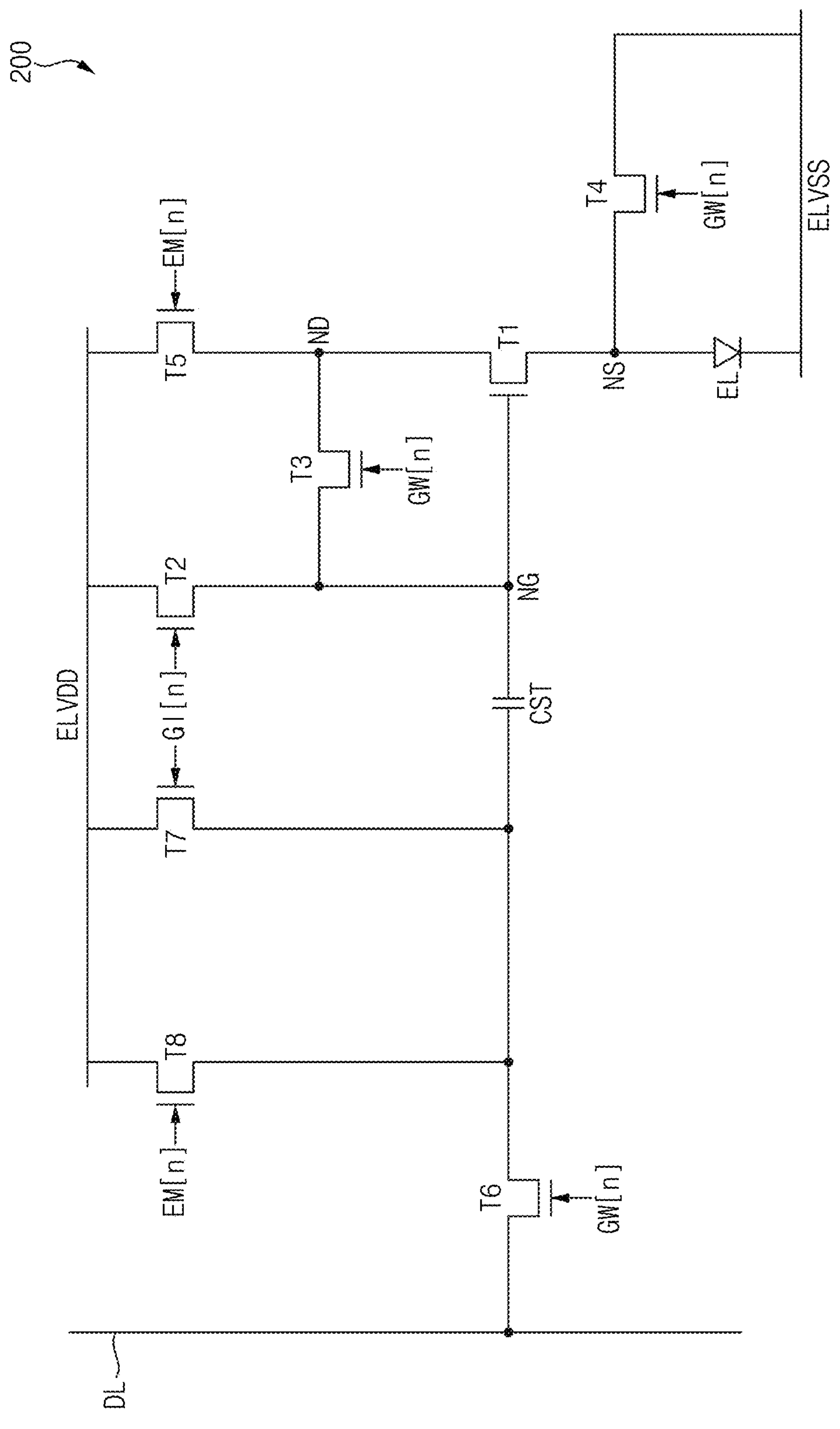
FIG. 7 is a circuit diagram illustrating a pixel according to some embodiments.

FIG. 7 is a circuit diagram illustrating a pixel according to an embodiment.

Referring to FIG. 7, a pixel 200 according to an embodiment may include a first transistor T1, a second transistor T2, a third transistor T3, a fourth transistor T4, a fifth transistor T5, a sixth transistor T6, a seventh transistor T7, an eighth transistor T8, a capacitor CST and a light emitting element EL. Compared with a pixel 100 illustrated in FIG. 1, the pixel 200 of FIG. 7 may further include the sixth transistor T6, the seventh transistor T7 and the eighth transistor T8.

The first transistor T1 may generate a driving current based on a voltage of a gate node NG. The second transistor T2 may transfer a first power supply voltage ELVDD to the gate node NG in response to an initialization signal GI[n]. The third transistor T3 may diode-connect the first transistor T1 in response to a write signal GW[n]. The fourth transistor T4 may transfer a second power supply voltage ELVSS to a source node NS in response to the write signal GW[n]. The fifth transistor T5 may transfer the first power supply voltage ELVDD to a drain node ND in response to an emission signal EM[n].

The sixth transistor T6 may be disposed between a data line DL and a first electrode of the capacitor CST, and may connect the data line DL to the first electrode of the capacitor CST in response to the write signal GW[n]. In some embodiments, the sixth transistor T6 may include a gate which receives the write signal GW[n], a first terminal connected to the first electrode of the capacitor CST, and a second terminal connected to the data line DL.

The seventh transistor T7 may transfer the first power supply voltage ELVDD to the first electrode of the capacitor CST in response to the initialization signal GI[n]. In some embodiments, the seventh transistor T7 may include a gate which receives the initialization signal GI[n], a first terminal which receives the first power supply voltage ELVDD, and a second terminal connected to the first electrode of the capacitor CST.

The eighth transistor T8 may transfer the first power supply voltage ELVDD to the first electrode of the capacitor CST in response to the emission signal EM[n]. In some embodiments, the eighth transistor T8 may include a gate which receives the emission signal EM[n], a first terminal which receives the first power supply voltage ELVDD, and a second terminal connected to the first electrode of the capacitor CST.

The capacitor CST may include the first electrode connected to the data line DL through the sixth transistor T6, and a second electrode connected to the gate node NG.

The light emitting element EL may emit light based on the driving current generated by the first transistor T1. The light emitting element EL may include an anode connected to the source node NS, and a cathode which receives the second power supply voltage ELVSS.

Figure 8:
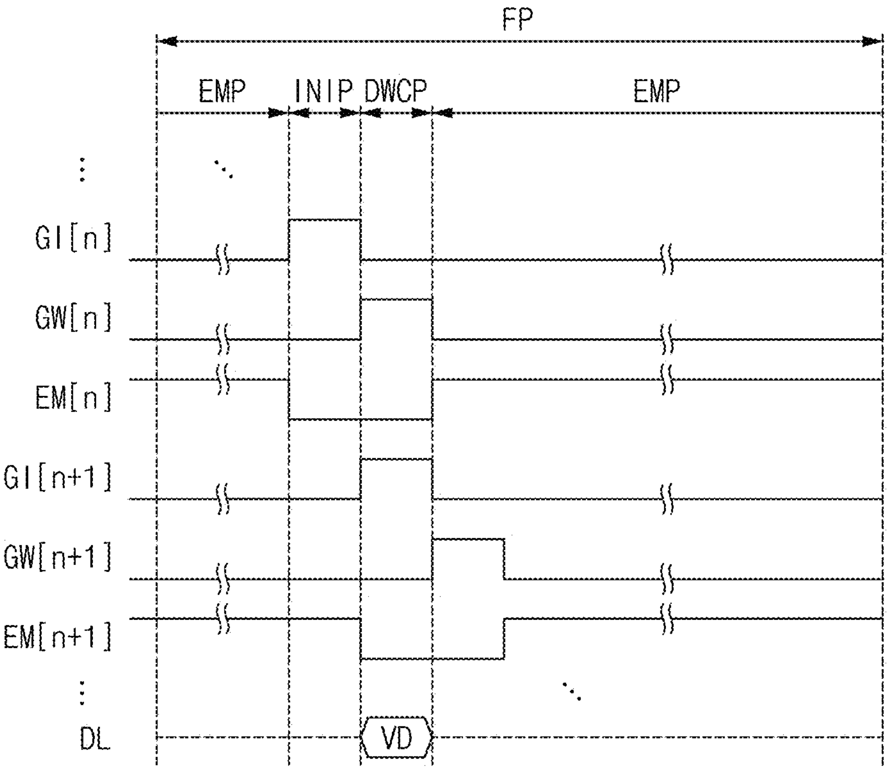
FIG. 8 is a timing diagram for describing an example of an operation of a pixel according to some embodiments.

In some embodiments, as illustrated in FIG. 8, the initialization signal GI[n], the write signal GW[n] and the emission signal EM[n] may be sequentially applied to a plurality of pixels of a display device on a row-by-row basis. Thus, the display device including the pixel 200 illustrated in FIG. 7 may perform a progressive emission driving operation that allows the plurality of pixels to sequentially emit light on a row-by-row basis.

Further, in some embodiments, as illustrated in FIG. 7, the first through eighth transistors T1 through T8 of the pixel 200 may be N-type transistors, for example, NMOS transistors. In other embodiments, some or all of the first through eighth transistors T1 through T8 may be P-type transistors, for example, PMOS transistors.

Hereinafter, an operation of the pixel 200 according to an embodiment is described below with reference to FIGS. 7 through 11.

Figure 9:
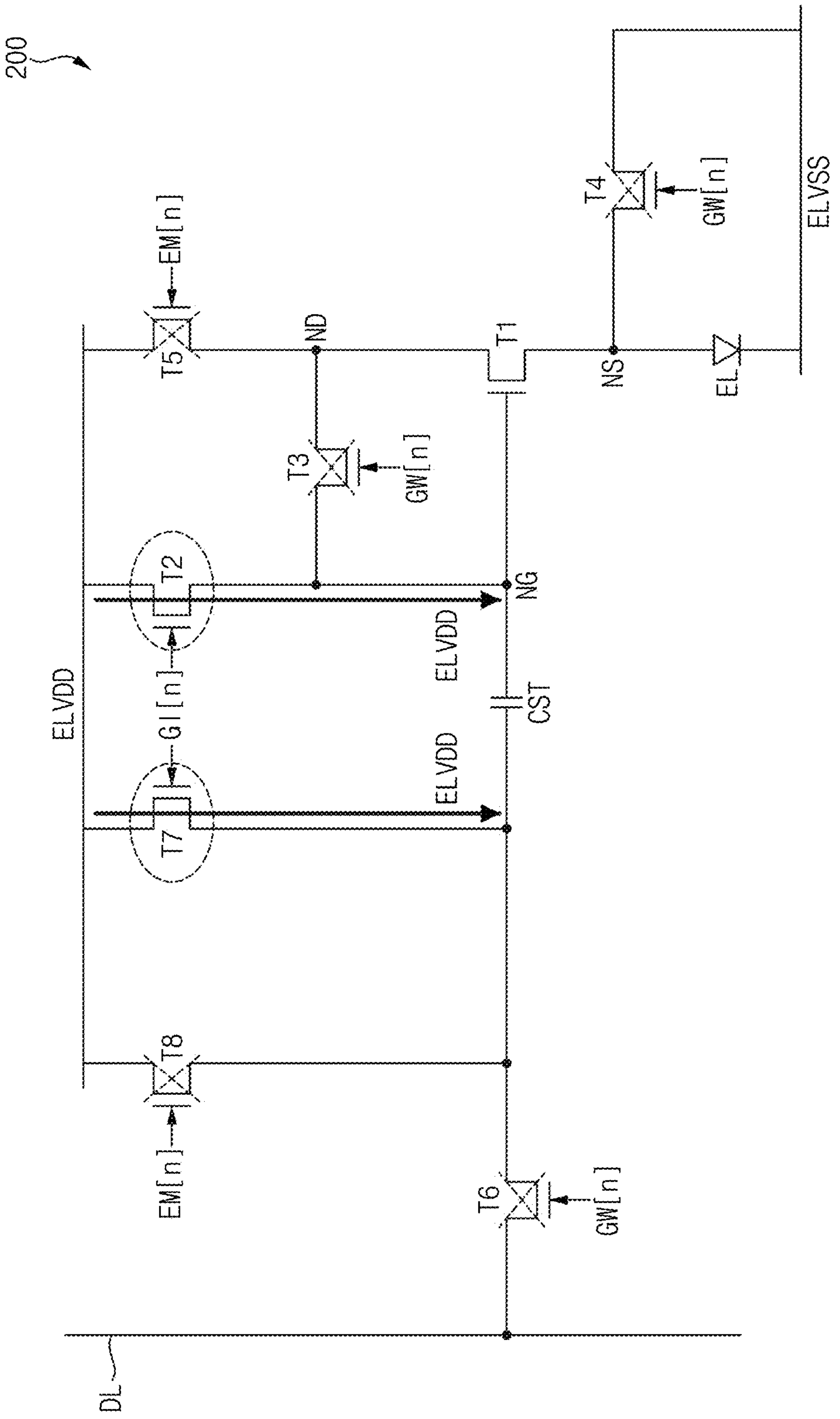
FIG. 9 is a circuit diagram for describing an operation of a pixel of FIG. 7 during an initialization period.
Figure 10:
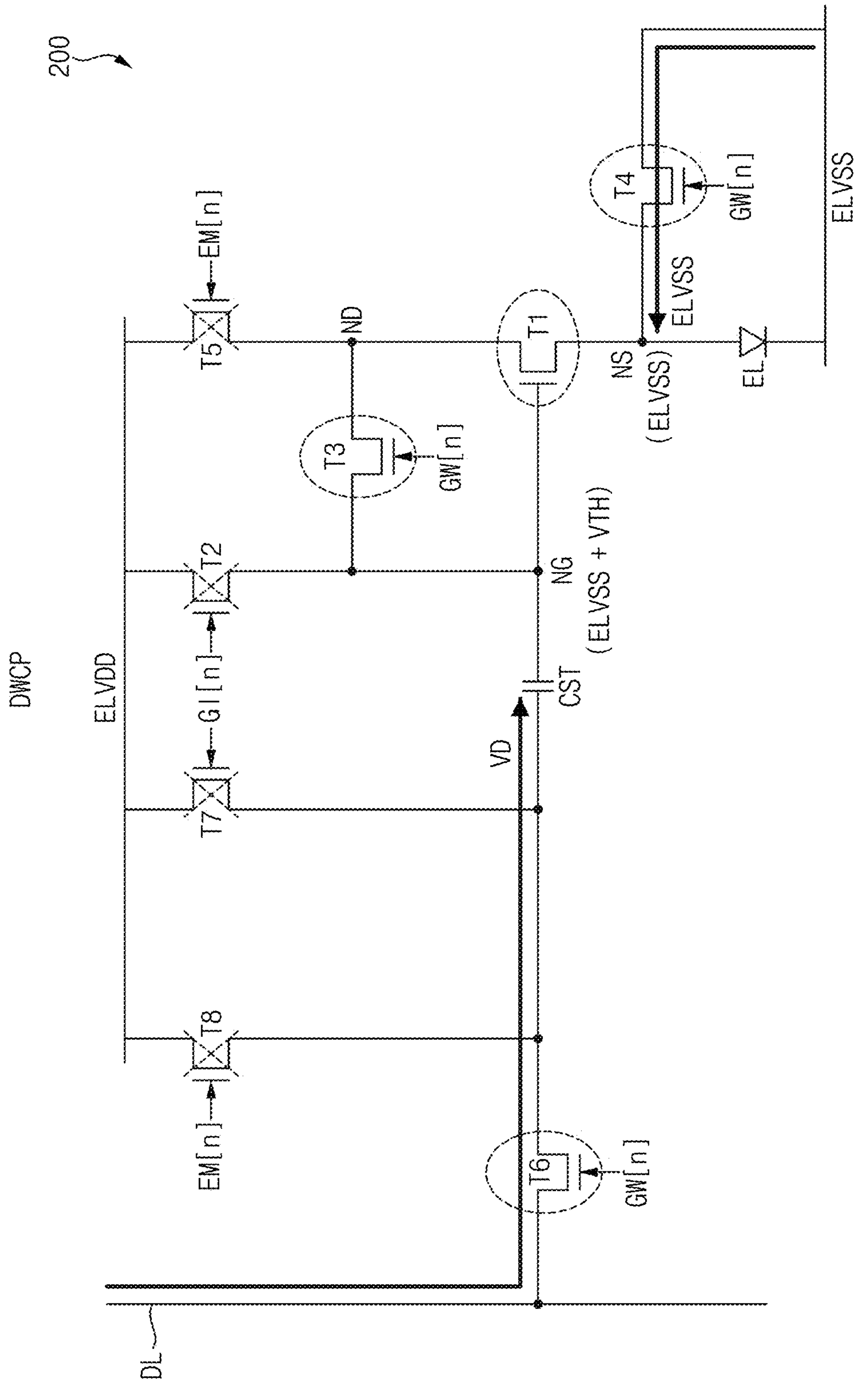
FIG. 10 is a circuit diagram for describing an operation of a pixel of FIG. 7 during a data writing and compensation period.
Figure 11:
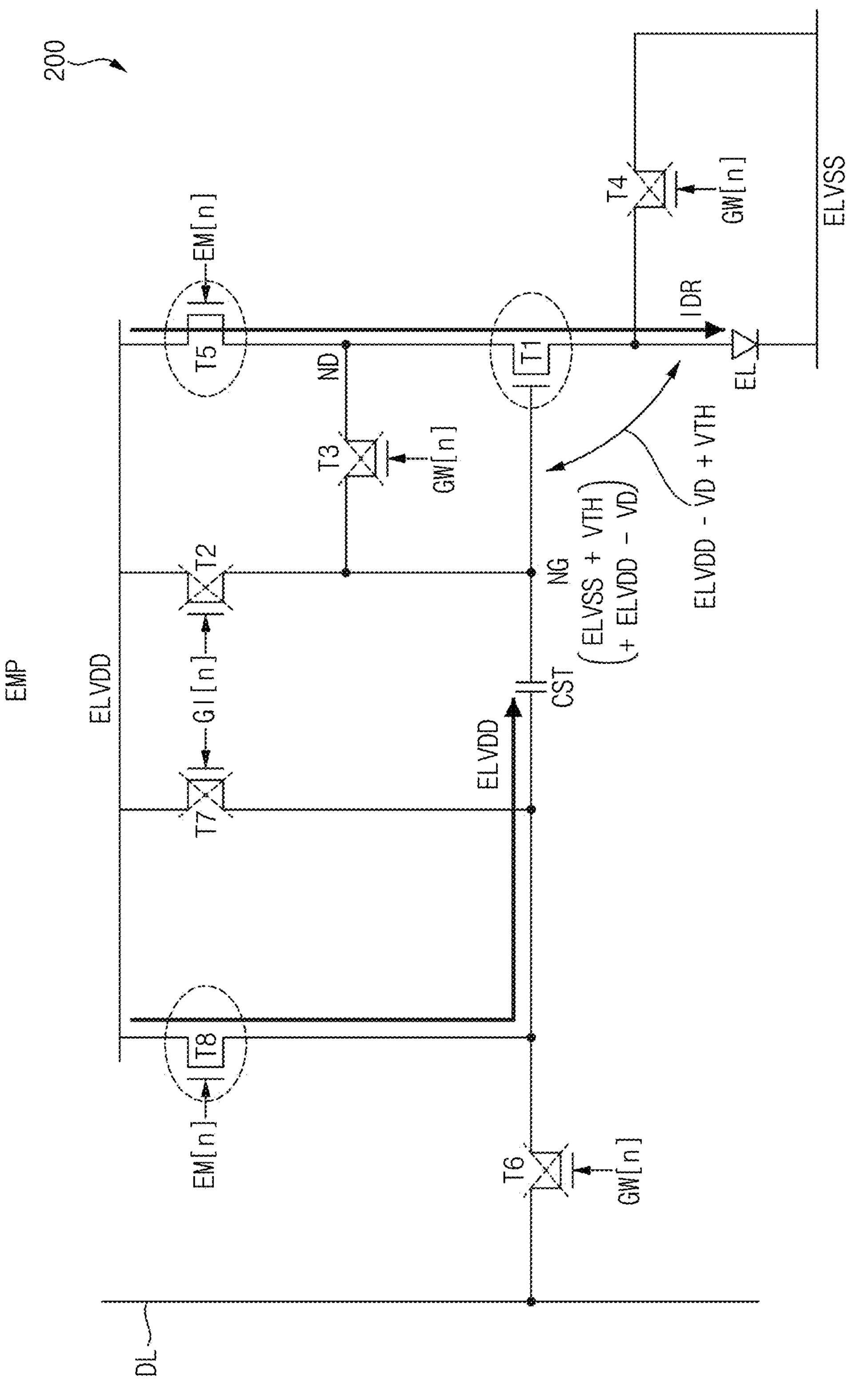
FIG. 11 is a circuit diagram for describing an operation of a pixel of FIG. 7 during an emission period.

FIG. 8 is a timing diagram for describing an example of an operation of a pixel according to an embodiment, FIG. 9 is a circuit diagram for describing an operation of a pixel of FIG. 7 during an initialization period, FIG. 10 is a circuit diagram for describing an operation of a pixel of FIG. 7 during a data writing and compensation period, and FIG. 11 is a circuit diagram for describing an operation of a pixel of FIG. 7 during an emission period.

Referring to FIGS. 7 and 8, in each frame period FP, the display device may sequentially provide the initialization signals GI[n] and GI[n+1], the write signals GW[n] and GW[n+1] and the emission signals EM[n] and EM[n+1] to the plurality of pixels on a row-by-row basis. For example, the display device may provide the initialization signal GI[n] having a high level to an N-th pixel row, where N is an integer greater than 0, and after a predetermined time (e.g., one horizontal time), may provide the write signal GW[n] having the high level and the initialization signal GI[n+1] having the high level to the N-th pixel row and an (N+1)-th pixel row, respectively. After the predetermined time (e.g., one horizontal time), the display device may provide the emission signal EM[n] having the high level and the write signal GW[n+1] having the high level to the N-th pixel row and the (N+1)-th pixel row, respectively. Further, after the predetermined time (e.g., one horizontal time), the display device may provide the emission signal EM[n+1] having the high level to the N+1th pixel row. In some embodiments, the frame period FP may include an initialization period INIP, a data writing and compensation period DWCP and an emission period EMP with respect to each pixel row. Further, during the initialization period INIP, the data writing and compensation period DWCP and the emission period EMP may be sequentially shifted by the predetermined time interval (e.g., one horizontal time) with respect to the respective pixel rows.

In the initialization period INIP, the initialization signal GI[n] may have the high level, and the write signal GW[n] and the emission signal EM[n] may have a low level. As illustrated in FIG. 9, the second transistor T2 and the seventh transistor T7 may be turned on in response to the initialization signal GI[n] having the high level, the second transistor T2 may transfer the first power supply voltage ELVDD to the gate node NG, and the seventh transistor T7 may transfer the first power supply voltage ELVDD to the first electrode of the capacitor CST. Thus, the gate node NG and the capacitor CST may be initialized based on the first power supply voltage ELVDD. Further, the third, fourth, fifth, sixth and eighth transistors T3, T4, T5, T6 and T8 may be turned off.

During the data writing and compensation period DWCP, the write signal GW[n] may have the high level, the initialization signal GI[n] and the emission signal EM[n] have the low level, and the data voltage VD may be provided to the pixel 200 through the data line DL. As illustrated in FIG. 10, the third transistor T3, the fourth transistor T4 and the sixth transistor T6 may be turned on in response to the write signal GW[n] having the high level, the third transistor T3 may diode-connect the first transistor T1, the fourth transistor T4 may transfer the second power supply voltage ELVSS to the source node NS, and the sixth transistor T6 may transfer the data voltage VD to the first electrode of the capacitor CST. Thus, a voltage of the first electrode of the capacitor CST may become the data voltage VD, and a voltage of the second electrode of the capacitor CST, or the voltage of the gate node NG may be changed from the first power supply voltage ELVDD to a voltage corresponding to a sum ELVSS+VTH of the second power supply voltage ELVSS and a threshold voltage VTH of the first transistor T1.

During the emission period EMP, the emission signal EM[n] may have the high level, and the initialization signal GI[n] and the write signal GW[n] may have the low level. As illustrated in FIG. 11, the fifth transistor T5 and the eighth transistor T8 may be turned on in response to the emission signal EM[n] having the high level, and the eighth transistor T8 may transfer the first power supply voltage ELVDD to the first electrode of the capacitor CST. Thus, the voltage of the first electrode of the capacitor CST may be changed from the data voltage VD to the first power supply voltage ELVDD by a voltage difference ELVDD−VD between the first power supply voltage ELVDD and the data voltage VD, and the voltage of the second electrode of the capacitor CST, or the voltage of the gate node NG also may be changed by the voltage difference ELVDD−VD between the first power supply voltage ELVDD and the data voltage VD. Accordingly, the voltage of the gate node NG may become "ELVSS+VTH+ELVDD−VD". Further, since the voltage of the source node NS is the second power supply voltage ELVSS, a gate-source voltage of the first transistor T1 may be "ELVDD−VD+VTH". Further, the first power supply voltage ELVDD may be higher than the data voltage VD. Thus, the first transistor T1 may be turned on based on the voltage of the gate node NG to generate the driving current IDR, and the light emitting element EL may emit light based on the driving current IDR. Meanwhile, when the first transistor T1 is turned on, the gate-source voltage of the turned-on first transistor T1 may be "ELVSS+VTH VD+(ELVDD ELVSS)*RT1/(RT1+REL)", and a current level of the driving current IDR generated by the first transistor T1 may be determined based on a voltage level of the data voltage VD regardless of the threshold voltage VTH of the first transistor T1.

Figure 12:
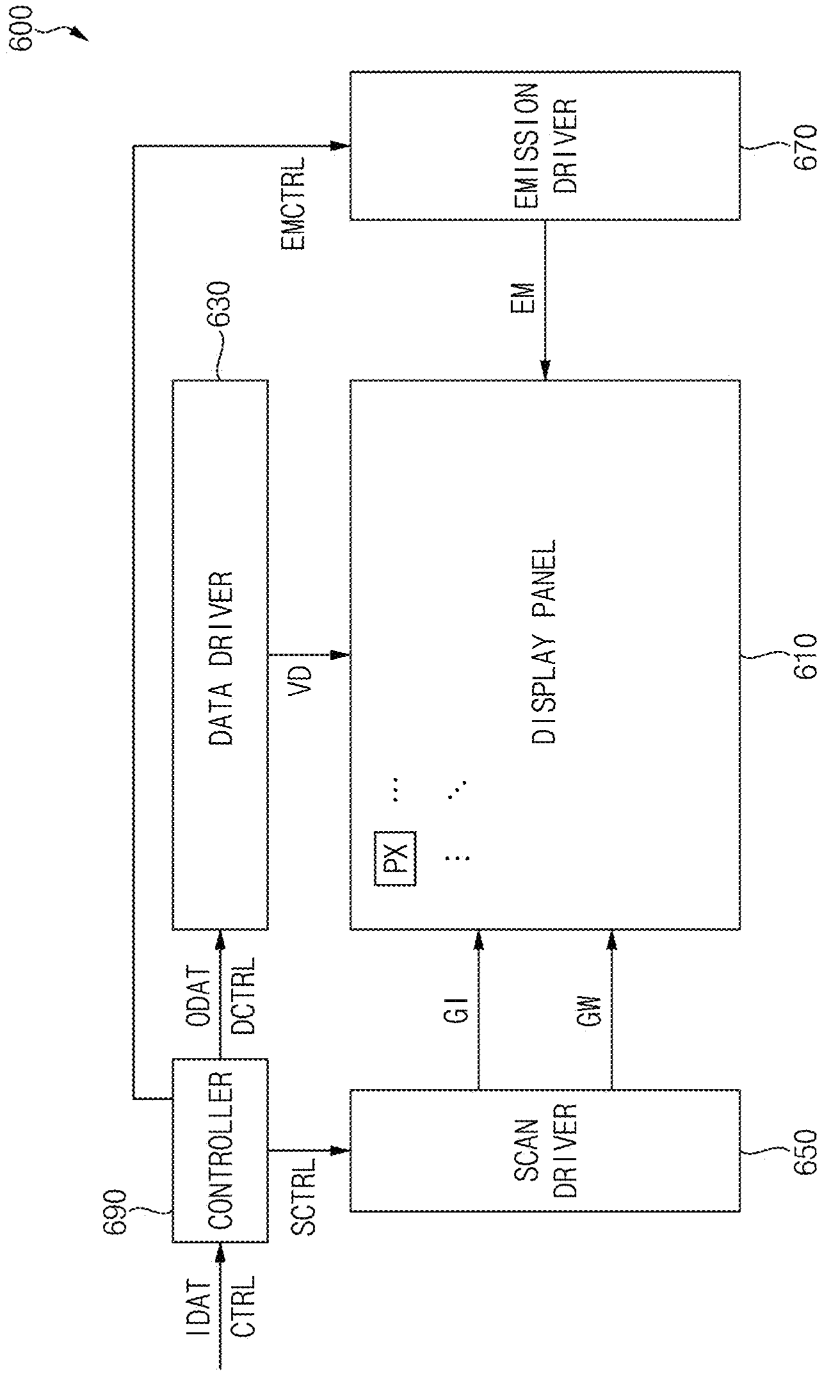
FIG. 12 is a block diagram illustrating a display device according to some embodiments.

FIG. 12 is a block diagram illustrating a display device according to an embodiment.

Referring to FIG. 12, a display device 600 according to an embodiment may include a display panel 610 that includes a plurality of pixels PX, a data driver 630 that provides a data voltage VD to each of the plurality of pixels PX, a scan driver 650 that provides an initialization signal GI and a write signal GW to each of the plurality of pixels PX, an emission driver 670 that provides an emission signal EM to each of the plurality of pixels PX, and a controller 690 that controls the data driver 630, the scan driver 650 and the emission driver 670.

The display panel 610 may include the plurality of pixels PX. According to an embodiment, each pixel PX of the display panel 610 may be a pixel 100 of FIG. 1, a pixel 100*a* of FIG. 6, a pixel 200 of FIG. 7, or the like. Each pixel PX may include NMOS transistors, and may perform a threshold voltage compensation operation in a diode connection method. Further, each pixel PX may include a small number of the NMOS transistors, and may have a small size. In addition, each pixel PX may receive only a small number of scan signals, or the initialization signal GI, the write signal GW and the emission signal EM, and the display device 600 may include only a small number of scan and emission drivers 650 and 670.

The data driver 630 may generate the data voltages VD based on output image data ODAT and a data control signal DCTRL received from the controller 690, and may provide the data voltages VD to the plurality of pixels PX. In some embodiments, the data control signal DCTRL may include, but is not limited to, an output data enable signal, a horizontal start signal, and a load signal. Further, in some embodiments, in a case where the display device 600 includes the pixel 100 illustrated in FIG. 1 or the pixel 100*a* illustrated in FIG. 6, as illustrated in FIGS. 1 and 2, the data driver 630 may provide the data voltages VD to the plurality of pixels PX in a data writing and compensation period DWCP, and may provide an emission voltage VEMI higher than the data voltages VD to the plurality of pixels PX during an initialization period INIP and an emission period EMP. In some embodiments, the data driver 630 and the controller 690 may be implemented as a single integrated circuit, and the single integrated circuit may be referred to as a timing controller embedded data driver ("TED") integrated circuit. In other embodiments, the data driver 630 and the controller 690 may be implemented as separate integrated circuits.

The scan driver 650 may provide the initialization signal GI and the write signal GW to each pixel PX based on a scan control signal SCTRL received from the controller 690. The scan control signal SCTRL may include, but is not limited to, a scan start signal and a scan clock signal. In some embodiments, in a case where the display device 600 includes the pixel 100 illustrated in FIG. 1 or the pixel 100*a* illustrated in FIG. 6, as illustrated in FIGS. 1 and 2, the scan driver 650 may substantially simultaneously provide the initialization signal GI to all the pixels PX of the display device 600, and may sequentially provide the write signals GW to the plurality of pixels PX of the display device 600 on a row-by-row basis. In other embodiments, in a case where the display device 600 includes the pixel 200 illustrated in FIG. 7, as illustrated in FIGS. 7 and 8, the scan driver 650 may sequentially provide the initialization signals GI and the write signals GW to the plurality of pixels PX of the display device 600 on a row-by-row basis. In some embodiments, the scan driver 650 may be integrated or formed in the display panel 610. In other embodiments, the scan driver 650 may be implemented with one or more integrated circuits.

The emission driver 670 may provide the emission signal EM to each pixel PX based on an emission control signal EMCTRL received from the controller 690. The emission control signal EMCTRL may include, but is not limited to, an emission start signal and an emission clock signal. In some embodiments, in a case where the display device 600 includes the pixel 100 illustrated in FIG. 1 or the pixel 100*a* illustrated in FIG. 6, as illustrated in FIGS. 1 and 2, the emission driver 670 may substantially simultaneously provide the emission signal EM to all the pixels PX of the display device 600. In other embodiments, in a case where the display device 600 includes the pixel 200 illustrated in FIG. 7, as illustrated in FIGS. 7 and 8, the emission driver 670 may sequentially provide the emission signals EM to the plurality of pixels PX of the display device 600 on a row-by-row basis. In some embodiments, the emission driver 670 may be integrated or formed in the display panel 610. In other embodiments, the emission driver 670 may be implemented with one or more integrated circuits.

The controller 690 (e.g., a timing controller) may receive input image data IDAT and a control signal CTRL from an external processor (e.g., a graphics processing unit ("GPU"), an application processor ("AP") or a graphics card). In some embodiments, the control signal CTRL may include, but is not limited to, a vertical synchronization signal, a horizontal synchronization signal, an input data enable signal, a master clock signal, etc. The controller 690 may generate the output image data ODAT, the data control signal DCTRL, the scan control signal SCTRL and the emission control signal EMCTRL based on the input image data IDAT and the control signal CTRL. The controller 690 may control the data driver 630 by providing the output image data ODAT and the data control signal DCTRL to the data driver 630, may control the scan driver 650 by providing the scan control signal SCTRL to the scan driver 650, and may control the emission driver 670 by providing the emission control signal EMCTRL to the emission driver 670.

Figure 13:
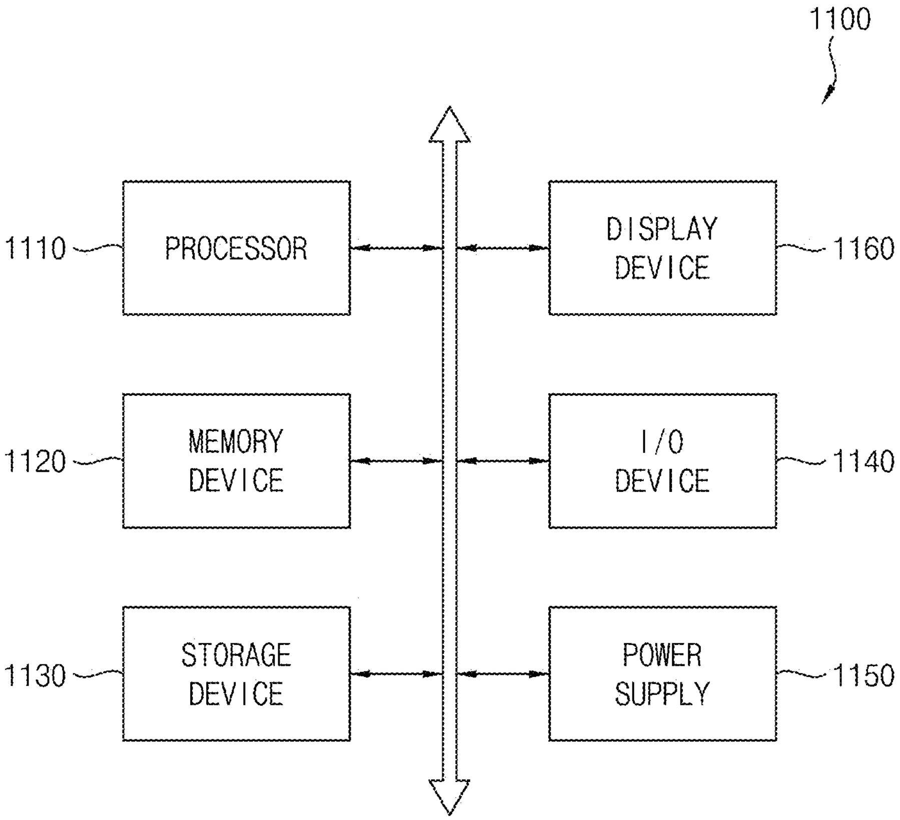
FIG. 13 is a block diagram illustrating an electronic device including a display device according to some embodiments.

FIG. 13 is a block diagram illustrating an electronic device including a display device according to an embodiment.

Referring to FIG. 13, an electronic device 1100 may include a processor 1110, a memory device 1120, a storage device 1130, an input/output (I/O) device 1140, a power supply 1150 and a display device 1160. The electronic device 1100 may further include a plurality of ports for communicating with a video card, a sound card, a memory card, a universal serial bus ("USB") device, other electric devices, etc.

The processor 1110 may perform various computing functions or tasks. The processor 1110 may be an application processor ("AP"), a micro-processor, a central processing unit ("CPU"), etc. The processor 1110 may be coupled to other components via an address bus, a control bus, a data bus, etc. Further, in some embodiments, the processor 1110 may be further coupled to an extended bus such as a peripheral component interconnection ("PCI") bus.

The memory device 1120 may store data for operations of the electronic device 1100. For example, the memory device 1120 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or at least one volatile memory device such as a dynamic random access memory ("DRAM") device, a static random access memory ("SRAM") device, a mobile dynamic random access memory ("mobile DRAM") device, etc.

The storage device 1130 may be a solid state drive ("SSD") device, a hard disk drive ("HDD") device, a compact disc-read only memory ("CD-ROM") device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

In the display device 1160, each pixel may include NMOS transistors, and may perform a threshold voltage compensation operation in a diode connection method. Further, each pixel may include a small number of transistors, and may have a small size. In addition, each pixel may receive a small number of scan signals, and the display device 1160 may include a small number of drivers.

The inventive concepts may be applied any electronic device 1100 including the display device 1160. For example, the inventive concepts may be applied to a mobile phone, a smart phone, a virtual reality ("VR") device, a television ("TV") (e.g., a digital TV, a three-dimensional ("3D") TV, etc.), a wearable electronic device, a personal computer ("PC") (e.g. a laptop computer, a tablet computer, etc.), a home appliance, a personal digital assistant ("PDA"), a portable multimedia player ("PMP"), a digital camera, a music player, a portable game console, a navigation device, etc.

The foregoing is illustrative of embodiments and is not to be construed as limiting thereof. Although a few embodiments have been described, those skilled in the art will readily appreciate that many modifications are possible in the embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A pixel of a display device, the pixel comprising:

a first transistor including a gate connected to a gate node, a first terminal connected to a drain node, and a second terminal connected to a source node;

a second transistor configured to transfer a first power supply voltage to the gate node in response to an initialization signal;

a third transistor configured to diode-connect the first transistor in response to a write signal;

a fourth transistor configured to transfer a second power supply voltage to the source node in response to the write signal;

a fifth transistor configured to transfer the first power supply voltage to the drain node in response to an emission signal;

a capacitor including a first electrode connected to a data line, and a second electrode connected to the gate node; and a light emitting element including an anode connected to the source node, and a cathode which receives the second power supply voltage.

2. The pixel of claim 1, wherein, when the write signal has a high level, the fourth transistor transfers the second power supply voltage to the source node, the third transistor connects the gate node and the drain node to each other, and the gate node has a voltage corresponding to a sum of the second power supply voltage and a threshold voltage of the first transistor.

3. The pixel of claim 2, wherein, when the write signal has the high level, a data voltage is applied to the first electrode of the capacitor through the data line.

4. The pixel of claim 3, wherein, when the emission signal has the high level, an emission voltage higher than the data voltage is applied to the first electrode of the capacitor through the data line.

5. The pixel of claim 1, wherein the second transistor includes a gate which receives the initialization signal, a first terminal which receives the first power supply voltage, and a second terminal connected to the gate node, wherein the third transistor includes a gate which receives the write signal, a first terminal connected to the gate node, and a second terminal connected to the drain node, wherein the fourth transistor includes a gate which receives the write signal, a first terminal connected to the source node, and a second terminal which receives the second power supply voltage, and wherein the fifth transistor includes a gate which receives the emission signal, a first terminal which receives the first power supply voltage, and a second terminal connected to the drain node.

6. The pixel of claim 1, wherein the first through fifth transistors are N-type metal oxide semiconductor (NMOS) transistors.

7. The pixel of claim 1, wherein the initialization signal is substantially simultaneously applied to a plurality of pixels of the display device, wherein the write signal is sequentially applied to the plurality of pixels on a row-by-row basis, and wherein the emission signal is substantially simultaneously applied to the plurality of pixels.

8. The pixel of claim 1, wherein a frame period for the display device includes:

an initialization period in which the gate node is initialized;

a data writing and compensation period in which a data voltage is provided through the data line and a threshold voltage compensation operation is performed in a diode connection method; and an emission period in which the light emitting element emits light.

9. The pixel of claim 8, wherein, during the initialization period, the initialization signal has a high level, the write signal and the emission signal have a low level, an emission voltage is provided through the data line, the second transistor transfers the first power supply voltage to the gate node in response to the initialization signal having the high level, and the gate node is initialized based on the first power supply voltage.

10. The pixel of claim 8, wherein, during the data writing and compensation period, the write signal has a high level, the initialization signal and the emission signal have a low level, the data voltage is provided through the data line, the fourth transistor transfers the second power supply voltage to the source node in response to the write signal having the high level, the third transistor diode-connects the first transistor in response to the write signal having the high level, a voltage of the gate node is changed from the first power supply voltage to a voltage corresponding to a sum of the second power supply voltage and a threshold voltage of the first transistor, and the data voltage is applied to the first electrode of the capacitor through the data line.

11. The pixel of claim 8, wherein, during the emission period, the emission signal has a high level, the initialization signal and the write signal have a low level, an emission voltage is provided through the data line, the fifth transistor is turned on in response to the emission signal having the high level, the emission voltage higher than the data voltage is applied to the first electrode of the capacitor through the data line, the first transistor generates a driving current based on a voltage of the gate node, and the light emitting element emits light based on the driving current.

12. The pixel of claim 1, further comprising:

a sixth transistor disposed between the data line and the first electrode of the capacitor, and configured to connect the data line to the first electrode of the capacitor in response to the write signal;

a seventh transistor configured to transfer the first power supply voltage to the first electrode of the capacitor in response to the initialization signal; and an eighth transistor configured to transfer the first power supply voltage to the first electrode of the capacitor in response to the emission signal.

13. The pixel of claim 12, wherein the sixth transistor includes a gate which receives the write signal, a first terminal connected to the first electrode of the capacitor, and a second terminal connected to the data line, wherein the seventh transistor includes a gate which receives the initialization signal, a first terminal which receives the first power supply voltage, and a second terminal connected to the first electrode of the capacitor, and wherein the eighth transistor includes a gate which receives the emission signal, a first terminal which receives the first power supply voltage, and a second terminal connected to the first electrode of the capacitor.

14. The pixel of claim 12, wherein the first through eighth transistors are NMOS transistors.

15. The pixel of claim 12, wherein the initialization signal, the write signal and the emission signal are sequentially applied to a plurality of pixels of the display device on a row-by-row basis.

16. A pixel of a display device, the pixel comprising:

a first transistor including a gate connected to a gate node, a first terminal connected to a drain node, and a second terminal connected to a source node;

a second transistor including a gate which receives an initialization signal, a first terminal which receives a first power supply voltage, and a second terminal connected to the gate node;

a third transistor including a gate which receives a write signal, a first terminal connected to the gate node, and a second terminal connected to the drain node;

a fourth transistor including a gate which receives the write signal, a first terminal connected to the source node, and a second terminal which receives a second power supply voltage;

a fifth transistor including a gate which receives an emission signal, a first terminal which receives the first power supply voltage, and a second terminal connected to the drain node;

a capacitor including a first electrode connected to a data line, and a second electrode connected to the gate node; and a light emitting element including an anode connected to the source node, and a cathode which receives the second power supply voltage.

17. The pixel of claim 16, wherein the initialization signal is substantially simultaneously applied to a plurality of pixels of the display device, wherein the write signal is sequentially applied to the plurality of pixels on a row-by-row basis, and wherein the emission signal is substantially simultaneously applied to the plurality of pixels.

18. The pixel of claim 16, further comprising:

a sixth transistor disposed between the data line and the first electrode of the capacitor, and including a gate which receives the write signal, a first terminal connected to the first electrode of the capacitor, and a second terminal connected to the data line;

a seventh transistor including a gate which receives the initialization signal, a first terminal which receives the first power supply voltage, and a second terminal connected to the first electrode of the capacitor; and an eighth transistor including a gate which receives the emission signal, a first terminal which receives the first power supply voltage, and a second terminal connected to the first electrode of the capacitor.

19. The pixel of claim 18, wherein the initialization signal, the write signal and the emission signal are sequentially applied to a plurality of pixels of the display device on a row-by-row basis.

20. An electronic device comprising:

a processor configured to provide input image data; and a display device configured to receive the input image data from the processor, and to display an image based on the input image data, wherein the display device includes:

a display panel including a plurality of pixels;

a data driver configured to provide a data voltage to each of the plurality of pixels;

a scan driver configured to provide an initialization signal and a write signal to each of the plurality of pixels;

an emission driver configured to provide an emission signal to each of the plurality of pixels; and a controller configured to control the data driver, the scan driver and the emission driver, and wherein each of the plurality of pixels includes:

a first transistor including a gate connected to a gate node, a first terminal connected to a drain node, and a second terminal connected to a source node;

a second transistor configured to transfer a first power supply voltage to the gate node in response to the initialization signal;

a third transistor configured to diode-connect the first transistor in response to the write signal;

a fourth transistor configured to transfer a second power supply voltage to the source node in response to the write signal;

a fifth transistor configured to transfer the first power supply voltage to the drain node in response to the emission signal;

a capacitor including a first electrode connected to a data line, and a second electrode connected to the gate node; and a light emitting element including an anode connected to the source node, and a cathode which receives the second power supply voltage.

* * * * *